(12) United States Patent
Butler (10) Patent No.: US 8,984,834 B1
(45) Date of Patent: Mar. 24, 2015

(54) UTILITY OR METER POLE TOP REINFORCEMENT METHOD AND APPARATUS

(71) Applicant: PLS Technologies, Inc., Palm Harbor, FL (US)

(72) Inventor: Robert P. Butler, Palm Harbor, FL (US)

(73) Assignee: PLS Technologies, Inc., Palm Harbor, FL (US)

( * ) Notice: Subject to any disclaimer, the term of this patent is extended or adjusted under 35 U.S.C. 154(b) by 0 days.

(21) Appl. No.: 14/082,824

(22) Filed: Nov. 18, 2013

(51) Int. Cl.
*E02D 37/00* (2006.01)
*E04H 12/22* (2006.01)

(52) U.S. Cl.
CPC .................................. *E04H 12/2292* (2013.01)
USPC .................... 52/514; 52/835; 52/154; 52/170; 248/218.4

(58) Field of Classification Search
CPC ................ E04H 12/2292; E04H 12/04; E04C 2003/0473; E02D 5/64
USPC ......... 52/514, 835, 153, 154, 170; 248/218.4, 248/219.2; 405/216, 211, 251, 244; 403/312, 390, 11, 286
See application file for complete search history.

(56) References Cited

U.S. PATENT DOCUMENTS

| | | | | |
|---|---|---|---|---|
| 1,073,614 A | * | 9/1913 | McDearmid | 405/251 |
| 1,475,048 A | * | 11/1923 | Campbell | 52/835 |
| 1,615,092 A | * | 1/1927 | Longanecker | 52/696 |
| 2,704,586 A | * | 3/1955 | Kennedy | 403/388 |
| 3,201,834 A | * | 8/1965 | Baittinger | 403/312 |
| 3,240,459 A | * | 3/1966 | Spohn | 248/146 |
| 3,295,275 A | * | 1/1967 | Carlsen | 52/168 |
| 3,738,072 A | * | 6/1973 | Adrian | 52/170 |
| 4,516,365 A | * | 5/1985 | Chapman | 52/170 |
| 4,646,489 A | * | 3/1987 | Feller et al. | 52/165 |
| 4,697,396 A | * | 10/1987 | Knight | 52/170 |
| 5,067,626 A | * | 11/1991 | Leumi | 220/475 |
| 5,088,672 A | * | 2/1992 | Neuendorf et al. | 248/218.4 |
| 5,345,732 A | * | 9/1994 | Knight et al. | 52/170 |
| 5,371,986 A | * | 12/1994 | Guditis | 52/170 |
| 5,813,800 A | * | 9/1998 | Doleshal | 405/232 |
| 5,815,994 A | * | 10/1998 | Knight et al. | 52/170 |
| 2011/0271571 A1 | * | 11/2011 | Lennard | 40/606.01 |

* cited by examiner

*Primary Examiner* — Joshua J Michener
*Assistant Examiner* — Matthew Gitlin
(74) *Attorney, Agent, or Firm* — Ronald E. Smith; Smith & Hopen, P.A.

(57) ABSTRACT

An apparatus for reinforcing an upstanding utility/meter pole having a worn top includes an elongate brace adapted to bear against the pole near a top end of the pole. A washer plate is disposed in overlying relation to the elongate brace. A front support is secured to an opposite side of the pole by an elongate bolt that extends diametrically through the pole and is engaged by a nut to secure the brace and front support in sandwiching relation to the pole. A second embodiment reinforces a cross arm of a pole and a third embodiment ensleeves a pole at its uppermost end in a cylindrical body that serves as a prosthesis for a disintegrating pole top.

3 Claims, 10 Drawing Sheets

UTILITY OR METER POLE TOP REINFORCEMENT METHOD AND APPARATUS

BACKGROUND OF INVENTION

1. Field of the Invention

This invention relates, generally, to repair of upstanding poles such as utility poles. More particularly, it relates to methods and apparatuses for strengthening the tops of poles that have structurally deteriorated over time to avoid or delay the cost of replacing such poles.

2. Description of the Prior Art

Utility poles become degraded over time near the ground and also at their upper end. There are many patented devices for strengthening such poles at or near the ground so that they don't fall over but there has been little inventive activity for strengthening the upper end of such poles to which are connected dedicated voltage transmission/distribution lines as well as telephone/CATV lines.

Meter poles are smaller versions of utility poles; they are positioned near structures such as mobile homes where laws forbid the direct attachment of permanent lines. As used herein, the term "pole" refers to utility as well as meter poles or any other type of pole that may be in need of upper end reinforcement.

The current cost of replacing a utility pole that has lost its structural integrity is about three thousand dollars per pole. Every U.S. state has millions of such poles. There are between one hundred thirty to one hundred eighty million utility poles in use in North America and most utility companies replace about six thousand poles per year. The cost of course is passed along to the consumer.

The upper ends of many pressure-treated poles that were installed in the decade of the 1970s are now losing their structural integrity and are in need of replacement. The same will of course hold true in the future of poles installed in later decades as well. However, it would save companies and consumers substantial monies if those poles could be reinforced instead of replaced.

However, in view of the art considered as a whole at the time the present invention was made, it was not obvious to those of ordinary skill in the art how the upper ends of such poles could be reinforced at a cost substantially less than pole-replacement costs.

SUMMARY OF THE INVENTION

The long-standing but heretofore unfulfilled need for a device that reinforces deteriorating utility poles, meter poles, and the like is now met by a new, useful, and non-obvious invention.

The inventive structure is an apparatus for reinforcing an upstanding pole having an upper end that is worn, rotted, damaged, or otherwise in a deteriorated state.

The novel structure includes an elongate brace and at least two bolt-accommodating openings formed in the elongate brace. Each bolt-accommodating opening is centered on a longitudinal axis of symmetry of the elongate brace. The elongate brace is adapted to bear against the upstanding pole near the worn upper end of the upstanding pole.

At least two washer plates are disposed in overlying relation to the elongate brace and a bolt-accommodating opening is formed in each washer plate. The bolt-accommodating opening is centered on a longitudinal axis of symmetry of each washer plate and is aligned with a bolt-receiving opening formed in the elongate brace.

At least two elongate bolts are adapted to extend diametrically through the upstanding pole. Each elongate bolt extends through a preselected bolt-accommodating opening formed in the elongate brace and through the bolt-accommodating opening formed in the associated washer plate.

Each elongate bolt has a tool-engageable head and a free end that extends outwardly from the upstanding pole diametrically opposite from the tool-engageable head. A nut screw-threadedly engages the free end of each elongate bolt and advancement of the nut increasingly secures the associated washer plate to the elongate brace and therefore increasingly secures the elongate brace to the upstanding pole so that the upper end of the upstanding pole is reinforced by the elongate brace.

The elongate brace has a base and a pair of laterally spaced apart legs are formed integrally with the base. The legs are adapted to bear against the upstanding pole.

At least one cavity for accommodating a pre-existing, conventional washer is formed in the elongate brace in open communication with each bolt-accommodating opening. Each elongate bolt extends through the conventional washer-accommodating opening when the nut secures said washer plate to said elongate brace.

In a second embodiment, each washer plate has a recessed channel formed therein, centered on the longitudinal axis of symmetry of the washer plate. The recessed channel extends into an associated bolt-receiving opening and a spring lock is disposed in overlying relation to a bottom wall of the recessed channel. A nut screw-threadedly engages the free end of the elongate bolt in bearing relation to the spring lock so that advancing the nut increasingly urges the washer plate towards the elongate brace and therefore increasingly presses the elongate brace against the upper end of the upstanding pole.

In a third embodiment, each washer plate has a raised ridge formed therein, centered on the longitudinal axis of symmetry of the washer plate, said longitudinal axis of symmetry being coincident with the longitudinal axis of symmetry of the elongate brace.

In the third embodiment, a first spring lock is disposed in each bolt-accommodating opening formed in the elongate brace and a first nut is screw-threadedly engaged to the free end of the elongate bolt in bearing relation to the first spring lock. The elongate ridge is disposed in overlying relation to the first nut and a second spring lock is disposed in overlying relation to the elongate ridge. A second nut screw-threadedly engages the free end of the elongate bolt in bearing engagement to the second spring lock so that advancement of the first and second nuts enables each washer plate to bear increasingly against the elongate brace and thus cause the elongate brace to bear increasingly against the upper end of the pole, thereby reinforcing it.

All three embodiments include an elongate front support member that is arcuate in transverse section to conform to the surface of the pole and which is mounted on the upper end of the pole in diametric relation to the elongate brace so that the damaged upper end of the upstanding pole is sandwiched between the front support member and the elongate brace.

At least two openings are formed in the front support member to accommodate the elongate bolts that secure the front support member to the upstanding pole. The elongate bolt that extends through the elongate brace and washer plate is the same elongate bolt that extends through the preselected opening formed in the front support member, i.e., the elongate bolts secure the front support member to a first side of the pole and secure the elongate brace to a second, diametrically opposed side of the pole so that the upper end of the pole is sandwiched between the front support member and the elongate brace.

A fourth embodiment of the invention is an apparatus for supporting a horizontally disposed cross arm mounted to an upstanding pole. It includes a first vertical part that is adapted to be secured to the pole and a horizontal part formed integrally with the first vertical part at an upper end of the first part.

The horizontal part extends away from the pole and has a depth substantially equal to a depth of the cross arm.

A second vertical part is formed integrally with the horizontal part at a free end of the horizontal part and projects upwardly therefrom.

The horizontal part is adapted to abut and support a bottom wall of the cross bar and the second vertical part is adapted to abut a front wall of the cross bar to prevent rotation of the cross bar in a horizontal plane about a longitudinal axis of the pole.

An elongate brace is adapted to abut the pole in diametrically opposed relation to the cross arm support member and an aperture is formed in the first vertical part of the cross arm support member to receive a bolt that extends diametrically through the pole to secure the first vertical part and hence the cross arm support member to the pole.

A fifth embodiment of the invention is a prosthetic apparatus for reinforcing a deteriorating top of an upstanding pole. It includes a cylindrical main body having an upper rim at a first end of the main body. A pair of legs depend from a second end of the main body in diametrically opposed relation to one another.

A plurality of apertures is formed in the cylindrical main body in circumferentially and longitudinally spaced relation to one another to facilitate attachment of the cylindrical main body and the legs to the pole.

The upper rim projects above an uppermost end of the upstanding pole when the uppermost end is ensleeved by the cylindrical main body.

A top cap has a skirt having a length substantially equal to a distance of the upper rim above the uppermost end of the upstanding pole so that the skirt fits within the hollow interior of the cylindrical main body when the top cap engages the cylindrical main body.

A general object of this invention is to lengthen the lifetime of upstanding poles such as a utility poles owned by a public or private utility company or meter poles of the type used in connection with mobile homes.

A more specific object is to reinforce the upper end of such pales at a cost that is much less than the cost of replacing such a pole.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1A:
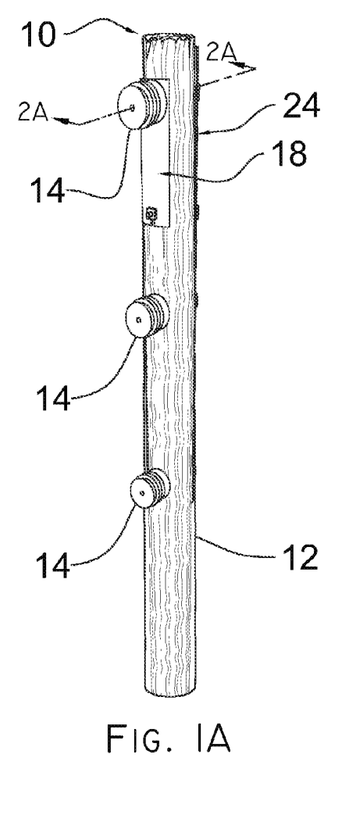
FIG. 1A is a front perspective view of a first embodiment.
Figure 1B:
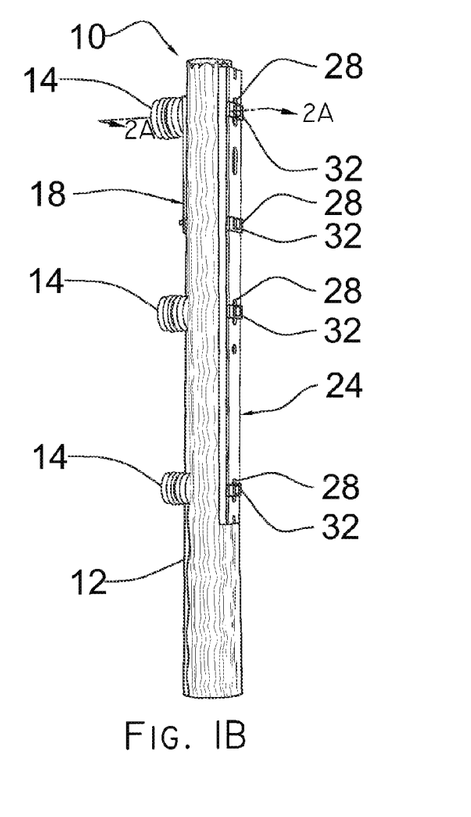
FIG. 1B is a rear perspective view of the first embodiment.
Figure 2A:
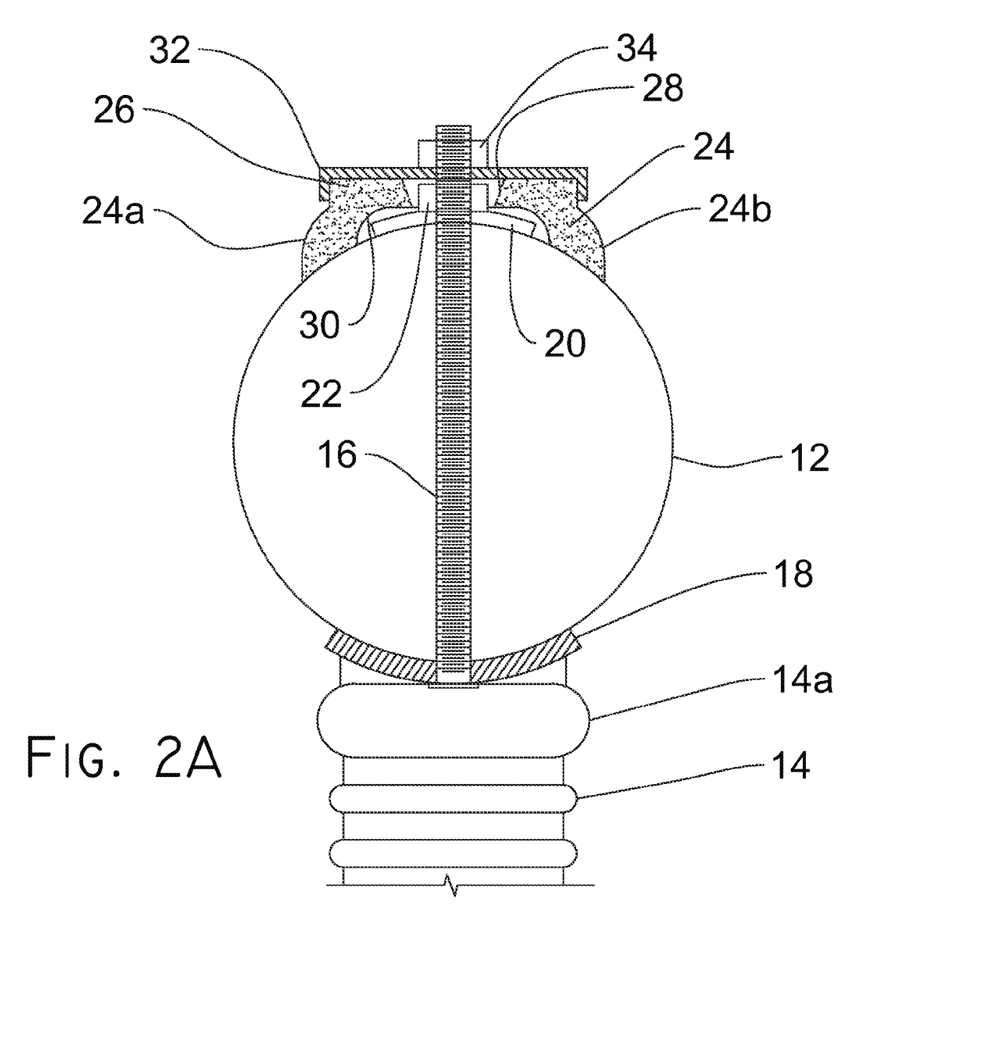
FIG. 2A is a sectional view taken along line 2A-2A in FIGS. 1A and 1B.

FIGS. 1A and 1B depict a first illustrative embodiment of the novel structure, denoted 10 as a whole, when installed on a utility or meter pole 12 having at least one insulator 14 secured thereto. The structure is perhaps more fully disclosed in FIG. 2.

In FIG. 2A, conventional insulator 14 having base 14a is secured to pole 12 near the uppermost end thereof by elongate bolt 16. Front support 18 conforms to the shape of pole 12 and its upper end provides support for insulator base 14a. Front support 18 has an elongate vertical extent as depicted in FIGS. 1A and 1B.

Conventional, pre-existing washer 20 near the top of FIG. 2A has an arcuate shape to conform to the shape of pole 12 and is held against the pole by conventional, pre-existing nut 22. Said washer and nut are diametrically opposed to conventional, pre-existing insulator base 14a.

The novel structure includes elongate brace 24 having laterally spaced apart legs 24a, 24b that bear against the top of pole 12 in diametrically opposed relation to elongate front plate 18 as depicted. Legs 24a, 24b are formed integrally with base 26 of elongate brace 24. At least two bolt-accommodating openings 28 are formed in said base 26, said openings being centered on a longitudinal axis of symmetry of said elongate brace. Each opening 28 is in open communication with an associated washer-accommodating opening 30. A plurality of openings 28 is formed along the vertical extent of elongate brace 24 as indicated in FIG. 1B. Each opening 28 may be provided as a circular opening or as an elongate slot as indicated in said FIG. 1B and as indicated in FIG. 3 as well.

Reinforcing base 26 is square at its outer or outboard surface, i.e., the surface that does not contact pole 12. Washer plate 32 conforms to that square configuration and overlies said outer surface as depicted. Nut 34 screw-threadedly engages bolt 16 and secures washer plate 32 and hence brace 24 to the top of the pole in diametric opposition to insulator 14 and elongate front support 18. Each washer plate 32 thus performs the function of a washer.

Figure 3:
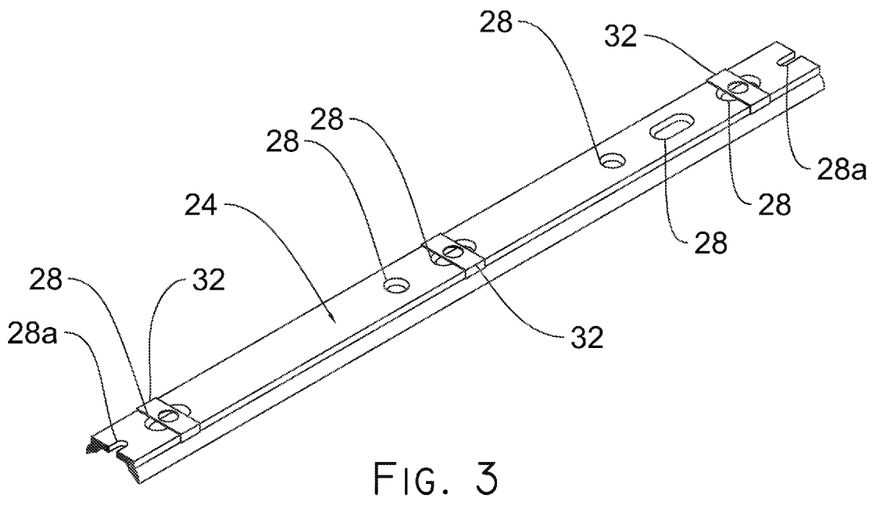
FIG. 3 is a perspective view of the back support brace of the first, second, and third embodiments.

Said elongate brace 24 and washer plates 32 are depicted in perspective view in FIGS. 1A and 3. Openings 28 are provided in plural locations in both circular and slotted form to accommodate various pole structures. Open slots 28a at the opposite ends of elongate brace 24 are used to accommodate pre-existing bolts as needed.

It will be observed in the embodiment of FIG. 2A that each nut 34 is provided at the time of pole repair, i.e., conventional nut 22 remains in its original position.

Figure 4:
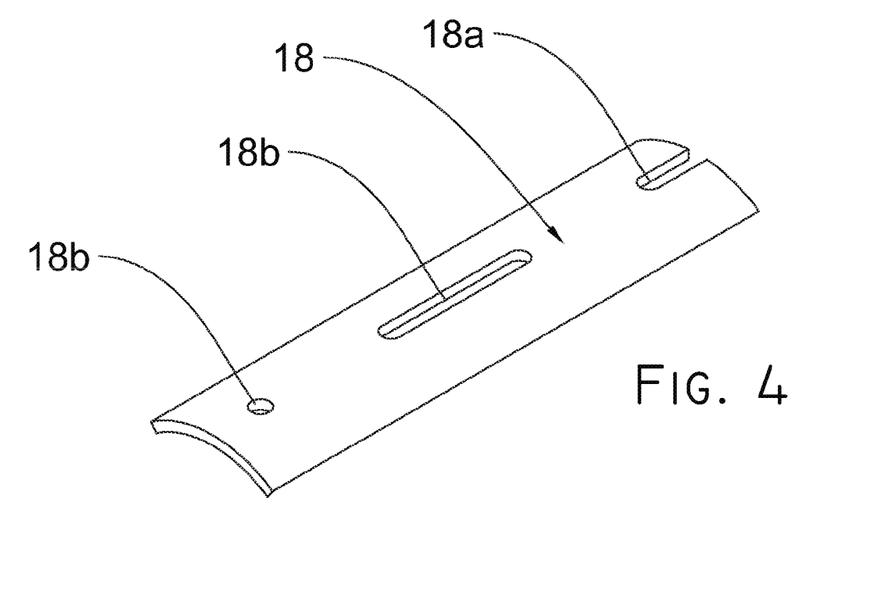
FIG. 4 is a perspective view of the elongate front support that is common to the first three embodiments.

Novel front support 18, depicted in FIGS. 1A, 1B, and 4 has an elongate structure. It has a first end that underlies insulator 14 and a second end that is longitudinally spaced apart from the first end and which therefore does not underlie the insulator.

Front support 18 is arcuate in transverse section and its upper end is slotted as at 18a to accommodate elongate bolt 16 which is not depicted in FIG. 4. Circular or slotted openings 18b are formed therein as depicted to accommodate bolts as needed for fastening front support 18 to the front or insulator side of pole 12.

Front support 18 and elongate brace 24, which provides back support, are disposed in diametrically opposed relation to one another and hold pole 12 in sandwiched relation between them.

Figure 2B:
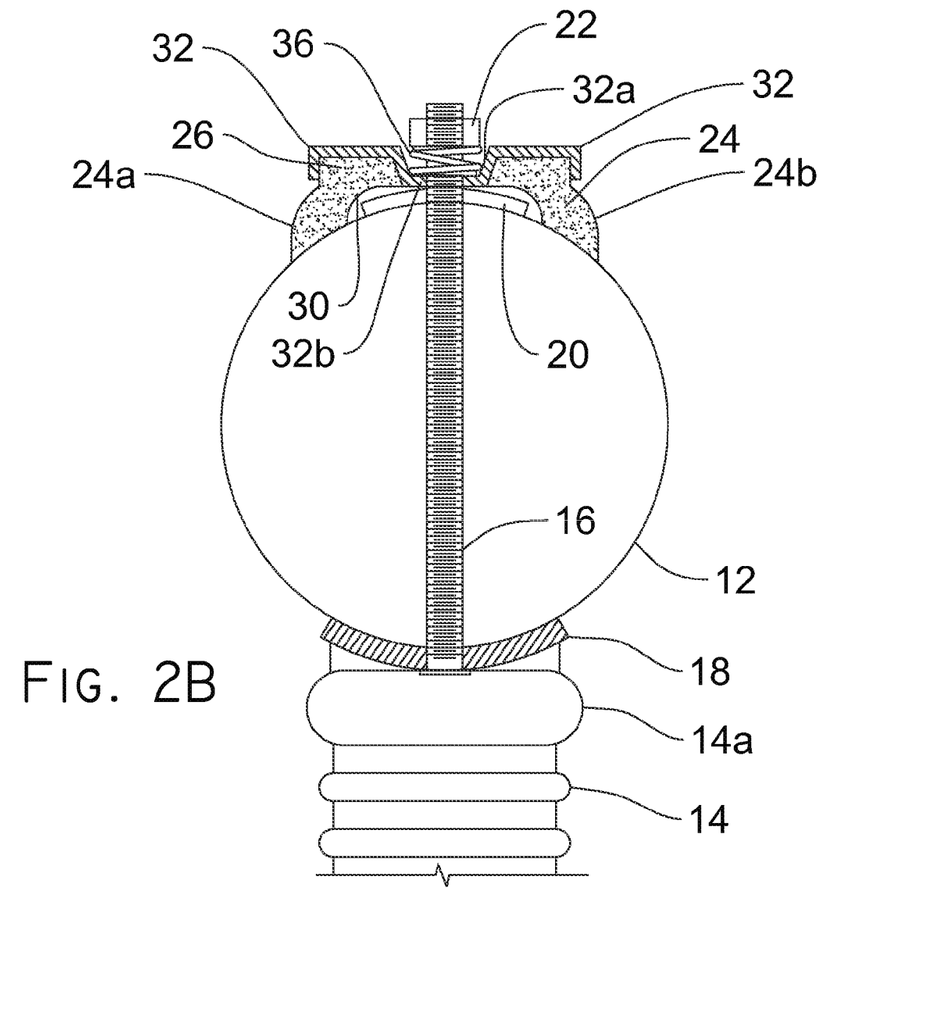
FIG. 2B is a view similar to the sectional view of FIG. 2A but depicts a second embodiment.

FIG. 2B depicts a second embodiment where conventional nut 22 is removed from bolt 16 and then re-engaged thereto. In this second embodiment, each washer plate 32 has a recessed channel 32a formed in the center thereof as depicted. Channel 32a includes centrally-apertured bottom wall 32b and said bottom wall is substantially flush with washer-accommodating opening 30. Bottom wall 32b thus performs the function of a washer and reinforces conventional washer 20

Each spring lock 36 fits within channel 32a and abuts channel bottom plate 32b Conventional nut 22 is returned to its screw-threaded engagement with bolt 16 to bear against spring lock 36. This second embodiment has the advantage of not requiring second nut 34 of the first embodiment.

Figure 2C:
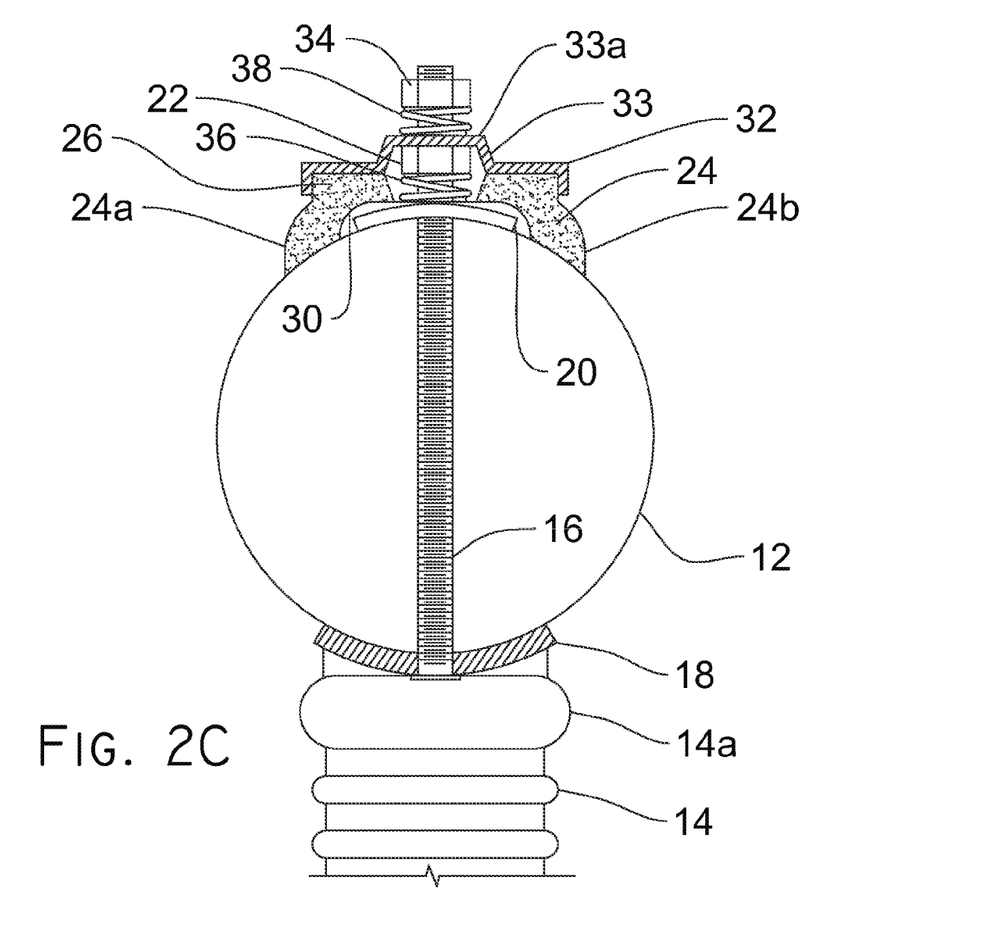
FIG. 2C is a view similar to the sectional view of FIG. 2A but depicts a third embodiment.

FIG. 2C depicts a third embodiment where conventional nut 22 remains as in the first embodiment in screw-threaded engagement with bolt 16, and where additional nut 34 of the first embodiment is also used.

In this third embodiment, each washer plate 32 has a raised ridge 33 that includes centrally-apertured top wall 33a as depicted in FIG. 2C. Conventional nut 22 and spring lock 36 are disposed in bearing relation to conventional washer 20. Each washer plate 32 is then placed into overlying relation to base 26 of elongate brace 24 in registration with each opening 28 as needed. A second spring lock 38 is placed into overlying relation to each top wall 33a and is secured thereto by a nut 34.

Figure 5A:
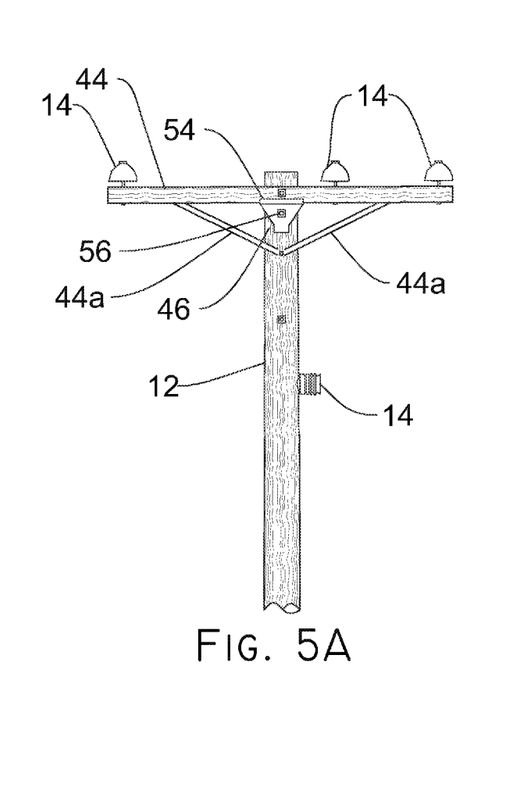
FIG. 5A is a front elevational view of the fourth embodiment.
Figure 5B:
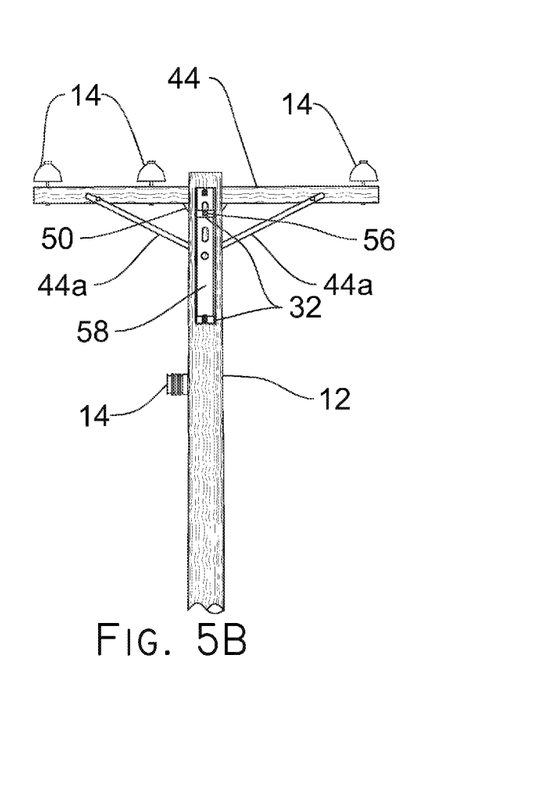
FIG. 5B is a rear elevational view of the fourth embodiment.
Figure 6:
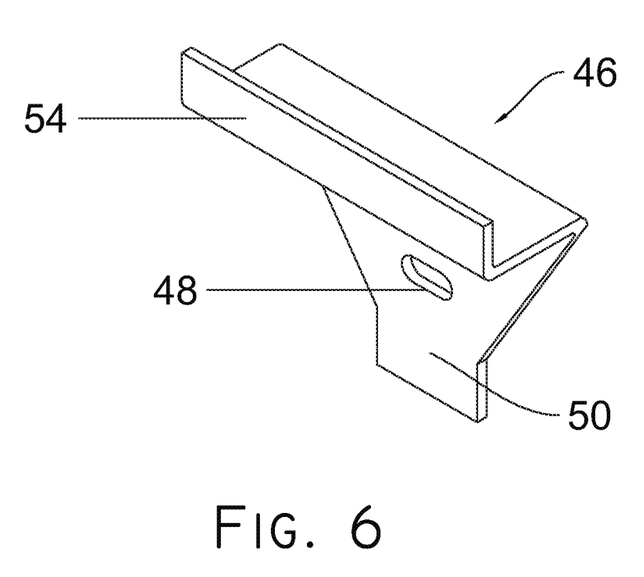
FIG. 6 is a perspective view of the novel cross arm support member of the fourth embodiment.

A fourth embodiment is depicted in FIGS. 5A, 5B, and 6. This embodiment has utility in connection with upstanding poles 12 having a cross arm 44, with or without braces 44a. The perspective view of FIG. 6 depicts cross arm support member 46. Aperture 48 is formed in first vertical part 50 and may take the form of a circular opening or an elongated slot as depicted. A first ninety degree bend forms horizontal part 52 and a second ninety degree bend forms second vertical part 54 which serves as a detent.

As depicted in FIG. 5A, bolt 56 is inserted into pole 12 through aperture 48 to secure cross arm support 46 to said pole. Cross arm support 46 is positioned on pole 12 so that horizontal part 52 serves as a support surface for cross arm 44 at the mid-length region of said cross arm. Horizontal support surface 52 has a depth substantially equal to a depth of cross arm 44 so that detent 54 overlies a front surface of cross arm 44 at least to some extent. Horizontal support surface 52 provides support for cross arm 44 and inhibits rotation of said cross arm in a vertical plane and detent 54 holds cross arm 44 so that said cross arm cannot rotate in a horizontal plane about the vertical axis of pole 12.

As depicted in FIG. 5B, bolt 56 which secures cross arm support 46 to pole 12 preferably extends diametrically through the pole and when used with a suitable nut and washer secures elongate brace 58 to the rear side of pole 12. Further bolts may be used to further secure said elongate brace 58 to pole 12, said brace 58 being provided with multiple apertures along its extent and slots at its opposite ends for that purpose. The sandwiching of pole 12 between cross arm support 46 and elongate brace 58 provides a heretofore unknown degree of support to cross arm 44.

Figure 7:
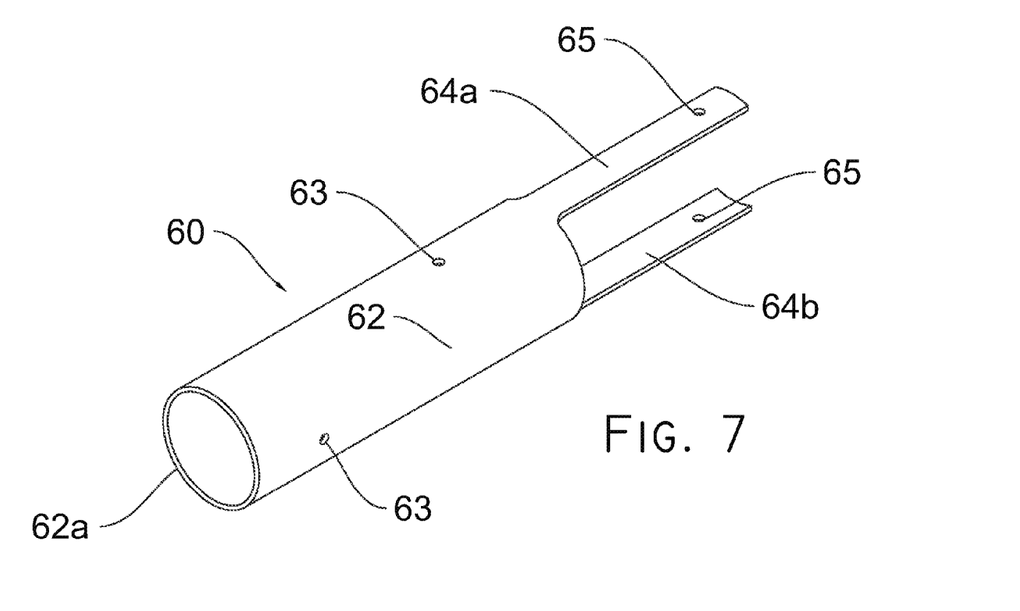
FIG. 7 is a perspective view of the cylindrical prosthesis of the fifth embodiment.
Figure 8A:
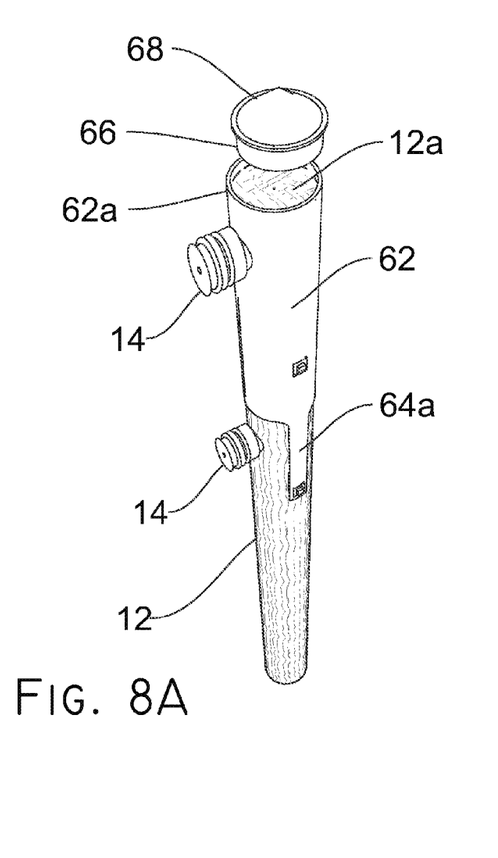
FIG. 8A is a partially exploded perspective view of the fifth embodiment when installed on a pole.
Figure 8B:
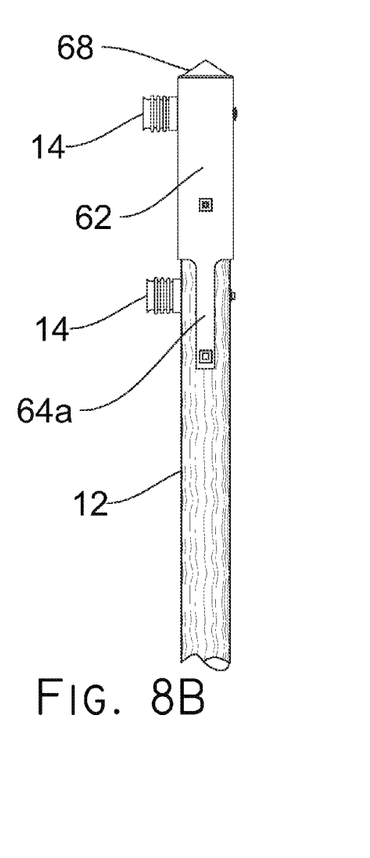
FIG. 8B is a perspective view of the fifth embodiment when installed on a pole.

A fifth embodiment is depicted in FIGS. 7, 8A and 8B. Main body 62 of brace 60 is cylindrical. Legs 64a, 64b depend from cylindrical main body 62 in diametrically opposed relation to one another. The upper rim of main body 62 is denoted 62a. Apertures collectively denoted 63 are formed in cylindrical main body 62 in circumferentially and longitudinally spaced relation to one another and apertures collectively denoted 65 are formed in legs 64a, 64b.

As depicted in FIG. 8A, upper rim 62a of cylindrical main body 62 projects above the uppermost end 12a of pole 12 when brace 60 is properly installed in ensleeving relation to a pole top. Skirt 66 of top cap 68 has a length equal to or just slightly less than the distance of rim 62a above pole top 12A so that said skirt fits within the hollow interior of cylindrical main body 62 when top cap 68 is in its functional position as depicted in FIG. 8B. The diameter of skirt 66 causes it to fit tightly with a good friction fit within said hollow interior so that high winds cannot cause it to separate from said functional position. Various bolts or screws extend through apertures 63 and 65 to secure brace 60 to pole 12.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus for reinforcing an upstanding pole having a worn top, comprising:
    an elongate brace;
    at least two bolt-accommodating openings formed in said elongate brace;
    said at least two bolt-accommodating openings being centered on a longitudinal axis of symmetry of said elongate brace in longitudinally spaced apart relation to one another;
    said elongate brace adapted to bear against said upstanding pole near a top end of said upstanding pole;
    said elongate brace having an elongate base and a pair of laterally spaced apart elongate legs formed integrally with said base, said elongate legs adapted to bear against said upstanding pole;
    a washer-accommodating cavity formed in said elongate brace in open communication with each of said at least two bolt-accommodating openings;
    a plurality of washer plates disposed in overlying relation to said base of said elongate brace in longitudinally spaced relation to one another;

a bolt-accommodating opening formed in each washer plate;

said bolt-accommodating opening formed in each washer plate being centered on a longitudinal axis of symmetry of each washer plate;

at least two elongate bolts adapted to extend diametrically through said upstanding pole, said at least two elongate bolts extending through an associated one of said at least two bolt-accommodating openings formed in said elongate brace and through said bolt-accommodating opening formed in each washer plate;

each of said at least two elongate bolts having a tool-engageable head and a free end that extends outwardly from said upstanding pole opposite from said tool-engageable head; and a nut that screw-threadedly engages respective free ends of said at least two elongate bolts and which secures each washer plate to said elongate brace;

an elongate front support member that is arcuate in transverse section so that it conforms to the curvature of the pole;

said elongate front support member having a first end adapted to be disposed between an insulator base and said pole and a second end adapted to overlie said pole a preselected distance from said first end;

an opening formed in said first end of said elongate front support member to accommodate a first elongate bolt of said at least two elongate bolts to secure said first end of said elongate front support member to a first side of said upstanding pole;

an opening formed in said second end of said elongate front support member to accommodate a second elongate bolt of said at least two elongate bolts for securing said second end of said elongate front support member to said first side of said upstanding pole;

said elongate front support member being secured to said upstanding pole in diametric opposition to said elongate brace and said washer plates so that said upstanding pole is sandwiched between said front support member and said elongate brace;

whereby said top end of said upstanding pole is reinforced on a first side by said elongate front support member and on a second side by said elongate brace.

2. The apparatus of claim 1, further comprising:

each washer plate having a recessed channel formed therein, said recessed channel being centered on said longitudinal axis of symmetry of each washer plate;

said recessed channel extending into a preselected bolt-receiving opening formed in said elongate brace;

a spring lock disposed in said preselected bolt-receiving opening in overlying relation to a bottom wall of said recessed channel;

a nut screw-threadedly engaged to an elongate bolt associated with said washer plate in bearing relation to said spring lock.

3. The apparatus of claim 1, further comprising:

each washer plate having a raised ridge formed therein, each raised ridge being centered on said longitudinal axis of symmetry of each washer plate;

a first spring lock disposed in a preselected bolt-accommodating opening formed in said elongate brace, said first spring lock abutting an associated washer plate;

a first nut screw-threadedly engaged to said preselected elongate bolt in bearing relation to said spring lock;

said raised ridge disposed in overlying relation to said first nut;

a second spring lock disposed in overlying relation to said raised ridge; and a second nut screw-threadedly engaged to said preselected elongate bolt and disposed in bearing engagement to said second spring lock so that advancement of said second nut causes each washer plate to bear increasingly against said base of said elongate brace.

* * * * *